US005229794A

United States Patent [19]

Honma et al.

[11] Patent Number: 5,229,794

[45] Date of Patent: Jul. 20, 1993

[54] CONTROL ELECTRODE FOR PASSING TONER TO OBTAIN IMPROVED CONTRAST IN AN IMAGE RECORDING APPARATUS

[75] Inventors: Yoshiyasu Honma, Nagoya; Tetsuya Kitamura, Gifu, both of Japan

[73] Assignee: Brother Kogyo Kabushiki Kaisha, Nagoya, Japan

[21] Appl. No.: 770,353

[22] Filed: Oct. 3, 1991

[30] Foreign Application Priority Data

Oct. 4, 1990 [JP] Japan .................................. 2-267119
Oct. 25, 1990 [JP] Japan .................................. 2-289925

[51] Int. Cl.[5] .............................................. G01D 15/06
[52] U.S. Cl. ..................................... 346/154; 346/159
[58] Field of Search ........................ 346/159, 154, 155

[56] References Cited

U.S. PATENT DOCUMENTS

| | | | |
|---|---|---|---|
| 3,689,935 | 9/1972 | Pressman et al. | 346/159 |
| 3,942,980 | 3/1976 | Hou | 346/159 |
| 3,962,969 | 6/1976 | Watanabe et al. | 346/159 |
| 4,143,962 | 3/1979 | Kurtz | 346/159 |
| 4,435,066 | 3/1984 | Tayumi et al. | 346/159 |
| 4,478,510 | 10/1984 | Fujii et al. | 346/159 |
| 4,491,855 | 1/1985 | Fujii et al. | 346/159 |
| 4,495,508 | 1/1985 | Tarumi et al. | 346/159 |
| 4,498,090 | 2/1985 | Honda et al. | 346/159 |
| 4,658,275 | 4/1987 | Fujii et al. | 346/154 |
| 4,860,036 | 8/1989 | Schmidlin | 346/159 |
| 4,912,489 | 3/1990 | Schmidlin | 346/159 |
| 5,068,961 | 12/1991 | Nishikawa | 346/159 |
| 5,095,322 | 3/1992 | Fletcher | 346/159 |

*Primary Examiner*—Benjamin R. Fuller
*Assistant Examiner*—Randy W. Gibson
*Attorney, Agent, or Firm*—Oliff & Berridge

[57] ABSTRACT

The invention relates to an image recording apparatus which directly controls a flow of toner particles for recording an image on a recording medium. The image recording apparatus of the invention, for recording an image on an image recording medium according to an image signal, has a toner particle supplying portion for supplying charged toner particles and a control electrode for directly controlling the flow of toner particles supplied from the toner particles supplying portion. The control electrode has a first electrode layer which has a thin board-like shape. The first electrode layer is provided on a base insulating material of the control electrode and is disposed facing to the toner particles supplying portion with a predetermined space therebetween. A first voltage power supply supplies a predetermined voltage, having at opposite polarity to that of the charged toner particles, to the first electrode layer. On the opposite side of the base insulating material is a second electrode layer made up of multiple independent electrodes. Each of the independent electrodes is supplied with a second voltage that is either larger or smaller than the predetermined voltage. A plurality of apertures, equal in number to the number of independent electrodes, that pass through the first electrode layer, the base insulating material and an associated independent electrode have an electrical field established therein that either pass or repel the charged toner particles to produce high density contrast images.

7 Claims, 5 Drawing Sheets

CONTROL ELECTRODE FOR PASSING TONER TO OBTAIN IMPROVED CONTRAST IN AN IMAGE RECORDING APPARATUS

BACKGROUND OF THE INVENTION

1. Field of the Invention

The present invention relates to an image recording apparatus which directly controls a flow of toner particles and records an image on a recording medium.

2. Description of Related Art

One conventional image recording apparatus, having an electric field formed between a control electrode and a back electrode to directly control the charged toner particles, permits an image to be recorded on an image recording medium that is inserted between the control electrode and the back electrode. The control electrode has a plurality of apertures through which charged toner particles or coloring particles can pass. A type of the above-mentioned apparatus is disclosed, for instance, in U.S. Pat. No. 3,689,935.

The control electrode comprises an insulative layer, a reference electrode layer and a plurality of independent, isolated segments of an independent electrode layer. The reference electrode layer is made from one sheet of metal which is laminated on the insulative layer on a side toward the supply of toner particles. The plurality of independent electrode segments are provided on the side of the insulative layer away from the supply of toner particles. Moreover, each of the independent electrode layers has a small hole, an aperture, therethrough. In other words, each aperture penetrates the reference electrode layer, the insulative layer and one of the segments of the independent electrode layer. Each of the independent electrodes segments is independently connected to an exclusive signal source (not shown) and the reference electrode has applied a fixed potential such as grounding.

However, the output print of the above-mentioned image recording apparatus does not provide enough density contrast. One of the main causes of this problem is that the charged toner particles supplied from a toner particles supplying portion are not attracted toward the reference electrode in large quantities because the reference electrode is grounded.

SUMMARY OF THE INVENTION

It is therefore an object of the invention to provide an image recording apparatus that produces a print with an increased and improved density contrast.

To achieve the above-mentioned object, the image recording apparatus of the invention for recording an image on an image recording medium according to an image signal, comprises:

a toner particle supplying means for supplying charged toner particles;

a control means for directly controlling a flow of toner particles supplied from said toner particle supplying means, said control means having a first electrode comprising a plurality of first independent electrodes, said first electrode being provided on a side of a base layer of said control means facing toward said toner particles supplying means with a predetermined space therebetween; and a voltage applying means for applying a predetermined first voltage to said first electrode layer which has an opposite polarity to that of the charged toner particles, wherein said control means comprises a control electrode having a plurality of apertures through which the charged toner particles may pass, said control electrode including:

the base layer being an insulative layer; and a plurality of second electrodes being provided around the plurality of apertures independently on a side of the insulative layer opposite the side where the first electrode is provided;

whereby said apertures pass through said insulative layer and a one of said apertures passes through each one of said first independent electrodes.

In this invention having the above-mentioned structure, the charged toner particles are attracted to the first electrode layer because the first voltage applying means applies a predetermined voltage which is of the opposite polarity to that of the charged toner particles and the control means controls the flow of toner particles for recording an image on a recording medium that corresponds to the image signal.

BRIEF DESCRIPTION OF THE DRAWINGS

A preferred embodiment of the present invention will be described in detail with reference to the following figures wherein.

DETAILED DESCRIPTION OF THE PREFERRED EMBODIMENT

Figure 1:
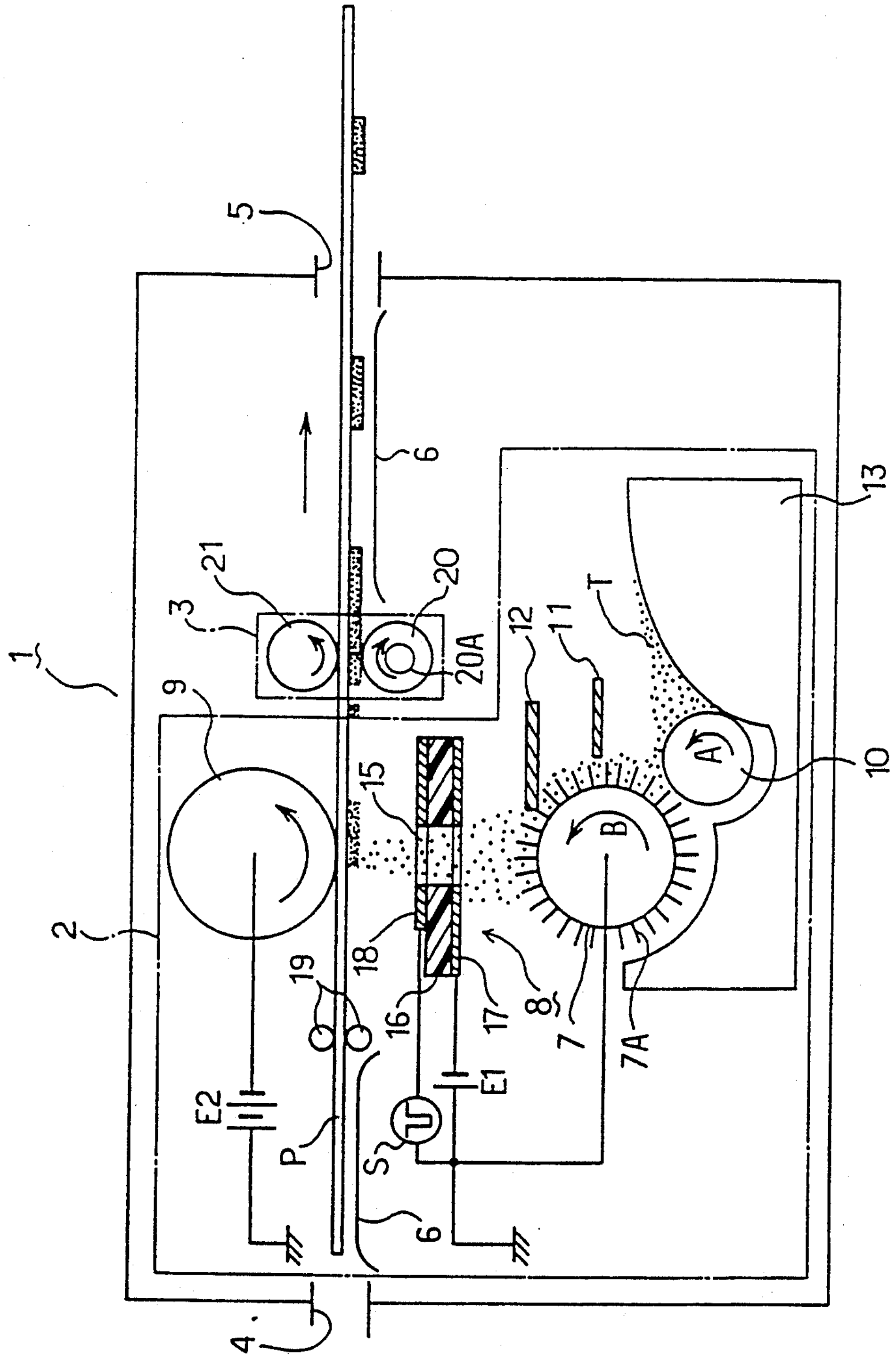
FIG. 1 is an outline structural view of an image recording apparatus in a first embodiment of the invention.
Figure 2:
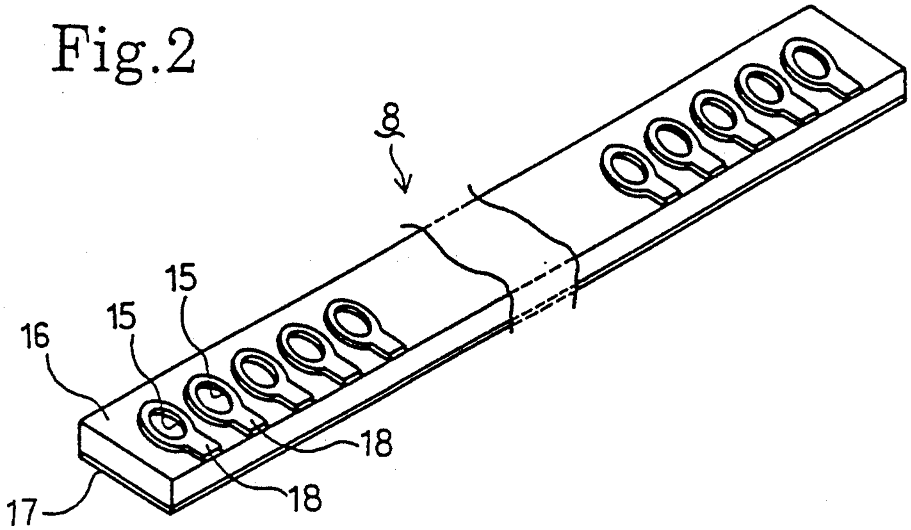
FIG. 2 is a perspective view of a control electrode used in the image recording apparatus of the first embodiment.

An embodiment of an image recording apparatus of the present invention will be explained with reference to FIGS. 1-3.

First, the structure of the image recording apparatus in a first embodiment will be explained with reference to FIGS. 1-2. FIG. 1 shows the structure of the image recording apparatus of the first embodiment. FIG. 2 is a perspective view of a control electrode used in the image recording apparatus of the first embodiment.

The inside of the image recording apparatus 1 is divided broadly into an image recording portion 2 and a thermal fixing portion 3. Moreover, a sheet inlet 4 is formed on one side of the image recording apparatus 1, and a sheet outlet 5 is formed on the other side. An image recording medium P such as an ordinary sheet of paper is inserted into the image recording apparatus 1 through the sheet inlet 4. In addition, the image recording medium P, onto which the image has been recorded is discharged from the sheet outlet 5 to the outside of the image recording apparatus 1.

The image recording portion 2 is composed of a carrying roller 7, a control electrode 8, an electrode roller 9, a supplying roller 10, a brush roller blade 11, a scratch blade 12, and a toner particles case 13 for storing toner particles T.

The carrying roller 7 comprises a roller made of a light weight, conductive metal, such as aluminum, and a brush 7A comprising a plurality of ciliary members is installed around the outer surface of the roller. The brush 7A is made of conductive nylon which is nylon permeated with carbon. The control electrode 8 is provided above the carrying roller 7. Moreover, the carrying roller 7 is arranged so that a part of the carrying roller 7 always exists in the toner particles case 13. Further, the carrying roller 7 is connected to a driving source (not shown) and can rotate in the direction of an arrow B (shown in FIG. 1). In the vicinity of the carrying roller 7, the supplying roller 10, the brush roller blade 11 and the scratch blade 12 are arranged respectively proceeding in the rotation direction of the carrying roller 7, that is, in order of the direction of an arrow B shown in FIG. 1. Moreover, the supplying roller 10 and the scratch blade 12 are arranged so as to come in contact with the carrying roller 7, respectively. The brush roller blade 11 is arranged so as to be close to the pointed ends of the ciliary members of brush 7A of the carrying roller 7 and the carrying roller 7 is grounded.

The supplying roller 10 is provided in the toner particles case 13. The supplying roller 10 is made of a sponge-like material such as urethane. The supplying roller 10 is rotated in the direction of an arrow A as shown in the FIG. 1 by a driving source (not shown). When the supplying roller 10 rotates, the toner particles T are slidably rubbed between the surface of the supplying roller 10 and the toner particles case 13 so that the toner particles T are triboelectrically charged. In the present embodiment, the toner particles T become positively charged. When the supplying roller 10 rotates further, in the direction of the arrow A, the toner particles T adhered on the surface of the supplying roller 10 are carried toward the carrying roller 7. Since the brush 7A, of the carrying roller 7, and the surface of the supplying roller 10 come in contact with each other, the toner particles T carried by the supplying roller 10 are further rubbed between the surfaces of these two rollers and the toner particles T are transferred from the surface of the supplying roller 10 to the brush 7A of the carrying roller 7.

The brush roller blade 11 is fixedly positioned so that the end of the brush roller blade 11 is close to the pointed ends of the ciliary members of the brush 7A of the carrying roller 7. Therefore, in case where too many toner particles T are supplied on the carrying roller 7, the end of the brush roller blade 11 comes in contact with the toner particles T. Therefore, the excessive toner particles T carried on the carrying roller 7 are removed so that the layer of the toner particles T is set in a predetermined thickness and the surface of the layer of the toner particles T is smoothed.

When the carrying roller 7 further rotates in the direction of the arrow B, the scratch blade 12 scratches the brush 7A of the carrying roller 7. Because the scratch blade 12 comes in contact with the brush 7A of the carrying roller 7, the toner particles T held and carried by the ciliary members of brush 7A are loosened and freed by the flipping of the ciliary members to become like a mist supplied to the area under the control electrode 8.

The structure of the control electrode 8 will be explained with reference to FIG. 2. FIG. 2 is a perspective view of the control electrode 8 and is shown looking toward the independent electrode side.

The control electrode 8 includes a insulative layer 16, a reference electrode layer 17, as a first electrode layer, and a plurality of independent electrodes 18, as a second electrode layer. Moreover, a plurality of apertures 15 that penetrate the insulative layer 16 and the reference electrode layer 17, are provided along one line passing through their centers.

The insulative layer 16 is a thin, board-type layer and is made of an insulating material. Any insulating material can be used for the insulative layer 16. For instance, various resins, ceramics and films such as PET film (polyethylene terephthalate film can be used).

The reference electrode layer 17 is made of a metal and preferably is of a one piece, thin, board-like shape that is connected to a negative DC power supply E1 (−200 V) The reference electrode layer 17 is provided on a side of the insulative layer 16 that is facing the carrying roller 7.

Each of the independent electrodes 18 is made of metal element and is provided independently of the other independent electrodes 18 on the reverse side of the insulative layer 16 from that where the reference electrode layer 17 is provided. An independent electrode 18 surrounds each of the apertures 15. The plurality of independent electrodes 18 are respectively connected to a plurality of signal sources S which are independently provided in the same number as there are independent electrodes 18. Each of the signal sources S applies two kinds of pulse voltage to its associated independent electrode 18 according to the image information. One pulse voltage is a lowest voltage of −250 V, the other voltage is a highest voltage of 100 V. As described below, the −250 V voltage is used as the toner particles passage voltage and the 100 V voltage is used as the toner particles cover voltage.

The electrode roller 9 is made of a metal, such as steel or aluminum, and is provided so as to face with the carrying roller 7 through the control electrode 8. The electrode roller 9 is arranged so as to maintain a predetermined distance from the control electrode 8. The image recording medium P, inserted from the sheet inlet 4, is carried by the guide 6 and a pair of supporting rollers 19 to pass through the space between the electrode roller 9 and the control electrode 8. The electrode roller 9 is connected to a negative DC power supply E2 (−1 kV). Therefore, the toner particles T being positively charged pass through the apertures 15 and are attracted to the electrode roller 9. The toner particles T attracted to the electrode roller 9 adhere to the image recording medium P which passes between the control electrode 8 and the electrode roller 9.

The thermal fixing portion 3 comprises a rotatable heat roller 20, with a heater 20A therein, and a rotatable press roller 21. The heat roller 20 and the press roller 21 are arranged so that the image recording medium P, on which the toner particles T are adhered, passes between the rollers. The toner particles T, on the image recording medium P, are melted by the heat from the heat roller 20. The melted toner particles T are pressured by the heat roller 20 and the press roller 21 so as to be fixed on the image recording medium P.

Next, the operation of the image recording apparatus 1 of the present embodiment will be explained with reference to FIGS. 1-3. FIG. 3 is a partial sectional view of the control electrode for showing the direction of the coulomb force to be applied to the toner particles in each of the apertures of the first embodiment.

The image recording medium P, inserted from the sheet inlet 4 into the image recording apparatus 1, is carried into the image recording portion 2, one sheet at a time, by a pair of rotating supporting rollers 19 while being supported by the guide 6. When the image recording medium P is carried into the image recording portion 2, the supplying roller 10 rotates in the direction of the arrow A (FIG. 1). When the supplying roller 10 rotates in the direction of the arrow A, the toner particles T are rubbed between the supplying roller 10 and the toner case 13, so that the toner particles T are triboelectrically charged with a positive polarity. The toner particles T, after being positively charged, are carried by the surface of the supplying roller 10 and come in contact with the brush 7A of the carrying roller 7. At this time, the toner particles T are further rubbed by coming in contact with the ciliary members of the brush 7A, of the carrying roller 7 which rotates in the direction of the arrow B. Then, any toner particles T which may not be completely positively charged become so. The toner particles T, now fully positively charged, move from the surface of the supplying roller 10 to the brush 7A of the carrying roller 7. The brush roller blade positioned so as to be close to the pointed ends of the ciliary members of the brush 7A of the carrying roller 7, removes the excessive toner particles T picked up by the carrying roller 7. Thus, a toner particles layer is formed on the surface of the carrying roller 7 such that the toner particles layer has a smooth surface and uniform thickness.

Next, the scratch blade 12, which is provided just below the control electrode 8, scrapes the brush 7A of the carrying roller 7 that carries the toner particles T. The scratch blade 12 is positioned and fixed to come into contact with the brush 7A of the carrying roller 7. Therefore, when the carrying roller 7 rotates, the brush 7A contacts the scratch blade 12 so that the ciliary members of the brush 7A bend owing to their elasticity. When the carrying roller 7 rotates in the direction of the arrow B, the ciliary members of the brush 7A further bend as they contact scratch blade 12 until they finally pass beyond and are freed from the scratch blade 12. Then, the brush 7A returns to its former state owing to the elasticity of its ciliary members. At this time, the toner particles T, which were held in a proper quantity in the brush 7A, are flipped from the brush 7A by the spring of the ciliary members. As a result, the toner particles T become like a mist and are supplied to the space just below the control electrode 8.

The mist of the toner particles T, which are positively charged, is attracted to the reference electrode layer 17 connected to the −200 V power supply E1. The flow of the toner particles T is modulated according to the pulse voltage applied from each of the signal sources S to each of the independent electrodes 18 of the control electrode 8.

Figure 3:
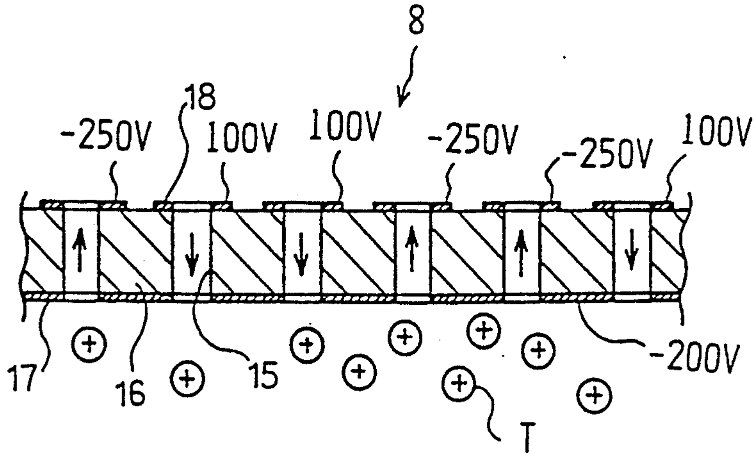
FIG. 3 is a partial sectional view of the control electrode for showing the direction of coulomb force to be caused in the toner particles in each of the apertures of the first embodiment.
Figure 5:
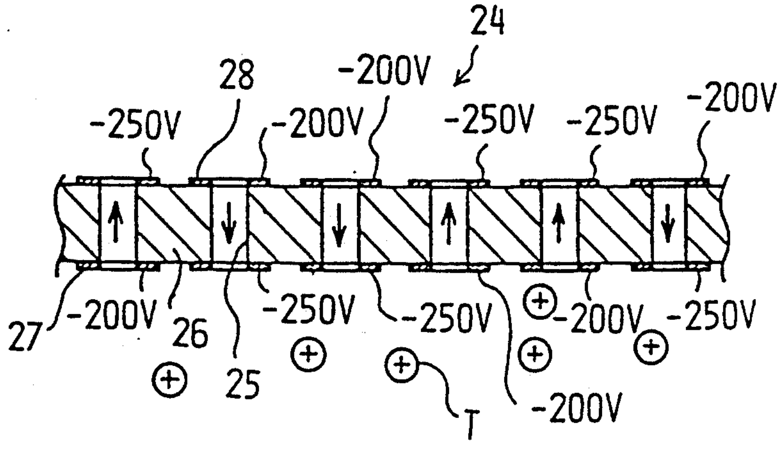
FIG. 5 is a partial sectional view of the control electrode for showing the direction of coulomb force to be caused in the toner particles in each of the apertures of a second embodiment.

As shown in FIG. 3, a −250 V, the toner particles passage voltage, or a 100 V, the toner particles cover voltage, current is applied from each of the signal sources S to each of the independent electrodes 18. An arrow, shown in each of the apertures 15 of FIG. 3, shows the direction of the electric field and the coulomb forces applied to a toner particle T in each of apertures 15. When −250 V, the toner particles passage voltage, is applied to an independent electrode 18, the toner particles T, being positively charged, receive the coulomb force directed toward the independent electrode 18 (−250 V) from the reference electrode layer 17 (−200 V). Therefore, the toner particles T pass through the associated aperture 15. Moreover, when 100 V, the toner particles cover voltage, is applied to an independent electrode 18, the toner particles T, being positively charged, receive the coulomb force directed toward the reference electrode layer 17 (−200 V) from the independent electrode 18 (100 V). Therefore, when the 100 V, the toner particles cover voltage, is applied to an independent electrode 18, the toner particles T, being positively charged, are repelled and cannot pass through the associated aperture 15.

The toner particles that pass through the control electrode 8 are positively charged. Accordingly, the toner particles T fly toward the electrode roller 9 which is connected to a negative DC power supply E2. The toner particles T adhere to the image recording medium P which is carried by the guide 6 and a pair of the supporting rollers 19. The toner particles T that pass through the apertures 15 and adhere to the image recording medium P make up the dots in the image to be recorded. Therefore, when the pulse voltage from each of the signal sources S is applied to each of the independent electrodes 18 according to the recording image, the toner particles T are modulated in the control electrode 8, so that the image is formed on the image recording medium P.

The density contrast ratio in a print output will be shown in the below formula.

*The density contrast ratio=Dmax/D0*

Dmax shows the density of the toner particles adhering on the image recording medium P in the case where the toner particles passage voltage (−250 V) is applied to the independent electrode 18 in order to modulate the toner particle flow. D0 shows the density of the toner particles adhering on the image recording medium P in the case where the toner particles cover voltage (100 V) is applied to the independent electrode 18 in order to modulate the toner particle flow.

Figure 7:
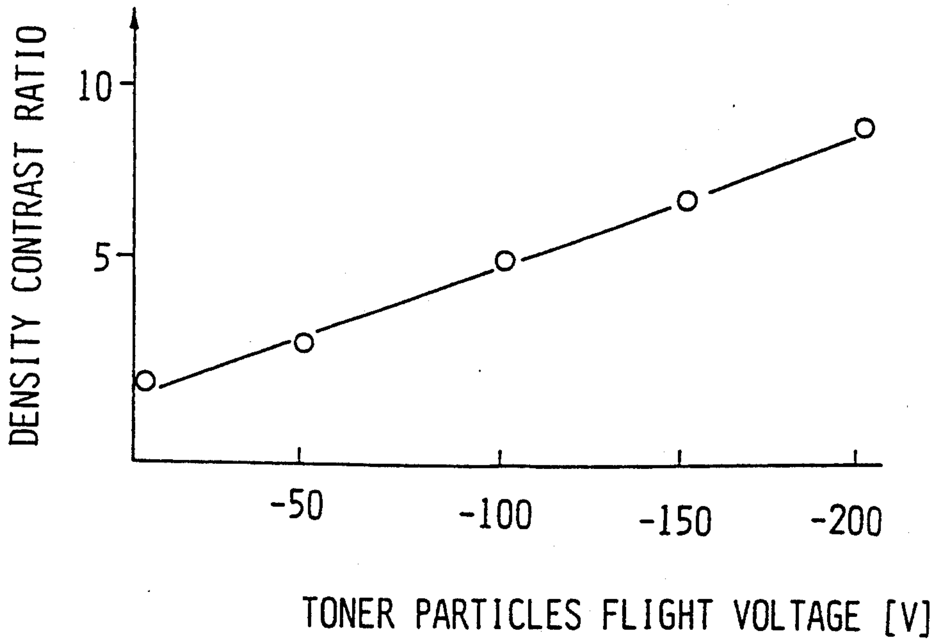
FIG. 7 is a line graph for showing the relation between toner particles flight voltage as applied to the reference electrode and density contrast ratio.

FIG. 7 is a line graph for showing the relation between the density contrast ratio and the toner particles flight voltage (0 V to 200 V) applied to the reference electrode layer 17.

It is obvious from the line graph that the density contrast ratio in the print output changes in proportion to the toner particles flight voltage applied to the reference electrode layer 17. In the present embodiment, since the toner particles T are charged positively, a negative toner flight voltage is applied to the reference electrode layer 17. As the negative toner particles flight voltage becomes lower, that is, the absolute value of the toner particles flight voltage becomes larger, the density contrast ratio in the print output becomes higher. Because the negative toner particles flight voltage is applied to the reference electrode layer 17, the toner particles T being positively charged are attracted in the direction of the reference electrode layer 17 in large quantities. Therefore, the amount of the toner particles T supplied on the image recording medium P increase.

In the above-mentioned first embodiment, the voltage to be applied to the reference electrode layer 17 is −200 V, but the voltage is not limited to −200 V.

After the above-mentioned operation, the image recording medium P is introduced to the thermal fixing portion 3. In the thermal fixing portion 3, the image recording medium P, having the toner particles T, is pressed between the heat roller 20 and the press roller 21. At this time, the toner particles T on the image recording medium P are melted by heat from the heater 20A of the heat roller 20 and the combination of heat and pressure fix the toner particles T image on the image recording medium P. Since the fixing method is well-known, a detailed explanation is omitted. Finally, the image recording medium P, on which the toner particles image is fixed, is carried to the sheet outlet 5 while being supported by the guide 6 by a further pair of rotating supporting rollers 19 (not shown) and is discharged to the outside of the image recording apparatus 1.

Figure 4:
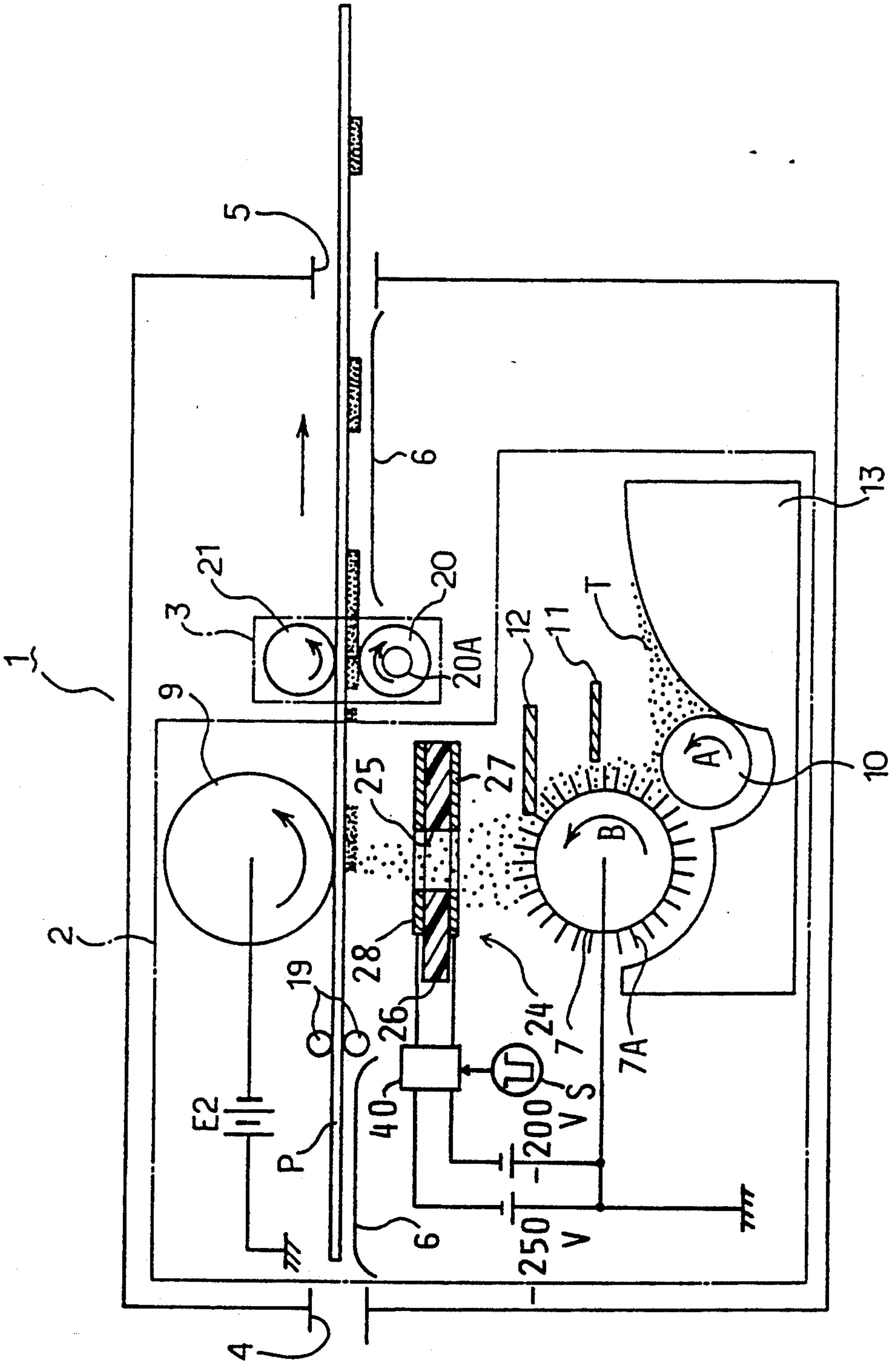
FIG. 4 is an outline structural view of an image recording apparatus in a second embodiment of the invention.

A second embodiment of the invention (FIG. 4) will now be explained.

Figure 6A:
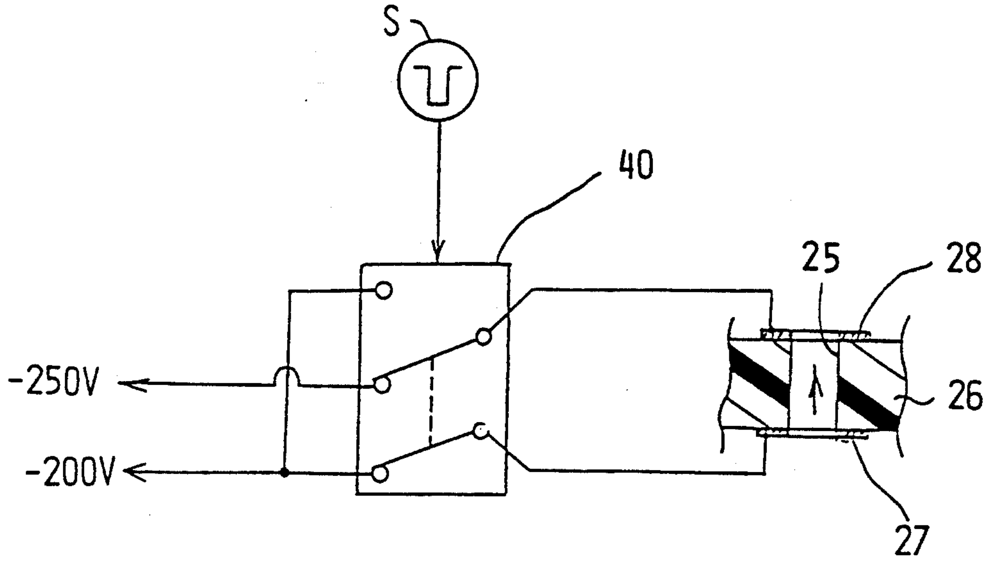
FIGS. 6A and 6B are figures showing the condition of the control electrode of the second embodiment to which is applied a voltage.
Figure 6B:
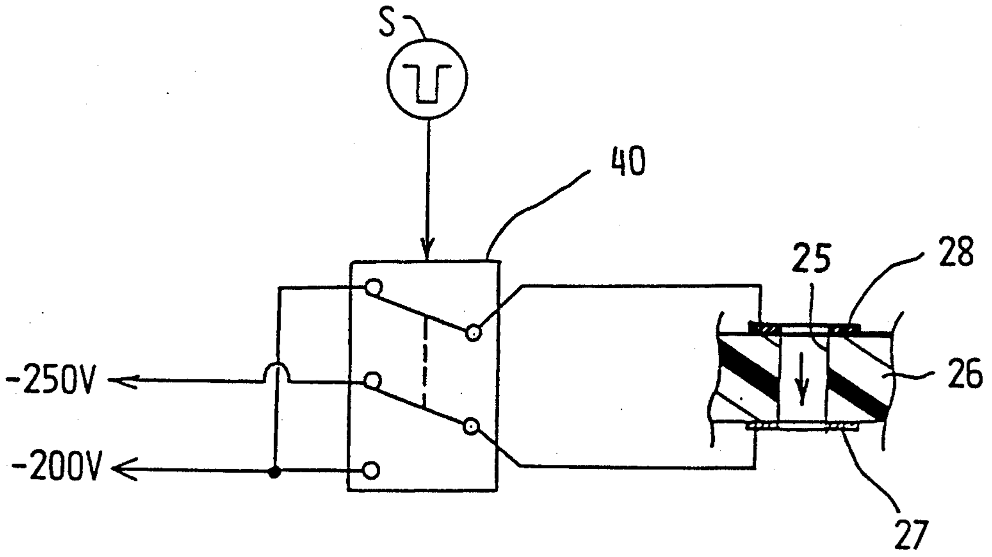

The image recording apparatus of the second embodiment has almost the same structure as the image recording apparatus of the first embodiment except for the control electrode 24, which has different structure than that of the image recording apparatus of the first embodiment. The control electrode 24 comprises an insulative layer 26, a plurality of reference electrodes 27, a plurality of independent electrodes 28 and a plurality of apertures 25. In the control electrode 24, a reference electrode 27 is independently provided around each of the apertures 25 in the same way as the independent electrodes 28. Further, as shown in FIGS. 6A–6B, a voltage of −250 V or −200 V is applied to each of the reference electrodes 27 and the independent electrodes 28 according to the output from the associated signal sources S. That is, either −250 V or −200 V is reciprocally applied to the reference electrode 27 and the independent electrode 28 of each pair through the relay circuit 40 associated with each paired reference electrode 27 and independent electrode 28. Arrows in the respective figures show the direction of the electric field and coulomb force applied to a toner particle T in each of apertures 25.

For each relay circuit 40, the voltage applied to the paired reference electrode 27 and the independent electrode 28 is changed according to the output from the signal source S. For instance, as shown in FIG. 6A, when an ON signal, that is, the toner particles passage signal is output from the signal source S to the relay circuit 40, −200 V is applied to the reference electrode 27 and −250 V is applied to the independent electrode 28. Under such a condition, the toner particles T, being positively charged, are attracted by the so set reference electrodes 27 of the control electrode 24 and, in the associated apertures 25, subjected to the coulomb force in the direction of an arrow as shown in the figure. Therefore, the toner particles T, being positively charged, pass through the aperture 25 in large quantities in the direction of the electrode roller 9.

As shown in FIG. 6B, when an OFF signal, that is, the toner particles cover signal is output from the signal source S to the relay circuit 40, −250 V is applied to the reference electrode 27 and −200 V is applied to the independent electrode 28. Under this condition, the toner particles T, being positively charged are attracted to the so set reference electrodes 27 of the control electrode 24. However, in the associated apertures 25, they are subjected to the coulomb force going toward the direction of the arrow as shown in the figure. Therefore, the toner particles T, being positively charged, cannot pass through the aperture 25 and the toner particles T cannot pass to the electrode roller 9. As a result, a high density contrast image is formed on the image recording medium P.

The image recording medium P having the toner particles T is then heated and subjected to pressure, so that the toner particles image is fixed on the image recording medium P in a similar manner to that described in the first embodiment. The image recording medium P, on which the toner particles image is fixed, is then discharged.

The invention is not limited to the abovedescribed embodiments. It should be understood that many changes and modifications may be made in the embodiments without departing from the scope of the invention.

For instance, in the first embodiment, the voltages applied to the independent electrodes 18 are −250 V and 100 V and the voltage applied to the reference electrode 17 is −200 V. However, the voltages are not limited to those voltages. If the reference electrode layer 17 is applied with a predetermined voltage, having an opposite polarity of the toner particles, and the independent electrode 18 has applied a higher voltage or a lower voltage than the predetermined voltage so long as the predetermined voltage is sufficient to attract a large quantity of toner particles T, a satisfactory high density contrast image can be produced.

In addition, in the second embodiment, the voltage to be applied to the reference electrodes 27 and the independent electrodes 28 is not limited to −200 V and −250 V.

What is claimed is:

1. An image recording apparatus for recording an image on an image recording medium according to an image signal, comprising:

a toner particle supply means for supplying charged toner particles;;

a control means for directly controlling a flow of toner particles supplied from said toner particles supplying means, said control means having a first electrode comprising a plurality of first independent electrodes, said first electrode being provided on a side of a base insulative layer of said control means facing toward said toner particle supplying means with a predetermined space therebetween; and a voltage applying means for applying a one of a first voltage and a second voltage to each said first independent electrodes of said first electrode, wherein said control means further comprises said base insulative layer having a plurality of apertures through which the charged toner particles may pass; and a plurality of second electrodes provided around the plurality of apertures independently, in a one-to-one relationship, on a side of the insulative layer opposite the side where the first electrode is provided, said voltage applying means applying a one of said first voltage and said second voltage to each said second electrode and said apertures pass through said insulative layer and a one of said apertures also passes through each one of said first independent electrodes, and wherein said first voltage and said second voltage are both opposite in polarity to that of said charged toner particles.

2. The image recording apparatus according to claim 1, further comprising a plurality of signal outputting means, each signal outputting means connected to an associated pair of electrodes comprising one of the first independent electrodes and one of the second electrodes, each of said signal outputting means for controlling the first voltage applied to said first independent electrode of said associated pair by said voltage applying means and a second voltage applied to said second electrode of said associated pair by voltage applying means.

3. The image recording apparatus according to claim 2, wherein said voltage applying means outputs a first and second voltage, said first voltage higher than said second voltage to create an electric field in said aperture that produces one result of the group consisting of attraction and repulsion of the charged toner particles.

4. An image recording apparatus for recording an image on an image recording medium according to an image signal, comprising:

a toner particle supplying means for supplying charged toner particles;

a control electrode having a plurality of apertures through which the charged toner particles can pass, said control electrode including an insulative layer, a plurality of independent first electrodes being provided around the plurality of apertures on a side of the insulative layer opposite to said toner particle supplying means and a plurality of second electrodes being independently provided around the plurality of apertures on a side of the insulative layer opposite to the side where said first electrodes are provided, each of said apertures passing through said insulative layer and an associated one of the first electrodes and one of the second electrodes;

a plurality of relay circuits for applying a first voltage and a second voltage to each associated pair of said first electrodes and said second electrodes alternatively, said first voltage and said second voltage applied to said first electrodes and said second electrodes both being opposite in polarity to said charged toner particles; and a plurality of signal outputting means, one of said signal outputting means connected to each of said relay circuits, for providing an output pulse signal corresponding to the image for changing said relay circuit.

5. The image recording apparatus according to claim 4, said image recording apparatus further comprising:

an electrode roller which is provided facing said toner particle supplying means with said control electrode therebetween; and a predetermined space through which the image recording medium can pass provided between said electrode roller and said control electrode.

6. The image recording apparatus according to claim 5, said image recording apparatus further comprising thermal fixing means for heating the image recording medium with the formed toner image thereon and fixing the toner image on the image recording medium.

7. The image recording apparatus according to claim 6, wherein said thermal fixing means comprises:

a heat roller having a heater therein; and a press roller for applying pressure to the image recording medium.

* * * * *